US008725704B2

(12) United States Patent
Levow

(10) Patent No.: US 8,725,704 B2
(45) Date of Patent: May 13, 2014

(54) CLIENT-SERVER TRANSACTIONAL PRE-ARCHIVAL APPARATUS

(75) Inventor: Zachary Levow, Camas, WA (US)

(73) Assignee: Barracuda Networks, Inc., Campbell, CA (US)

( * ) Notice: Subject to any disclaimer, the term of this patent is extended or adjusted under 35 U.S.C. 154(b) by 0 days.

(21) Appl. No.: 13/246,834

(22) Filed: Sep. 27, 2011

(65) Prior Publication Data

US 2013/0080407 A1 Mar. 28, 2013

(51) Int. Cl.
*G06F 7/00* (2006.01)
*G06F 17/30* (2006.01)

(52) U.S. Cl.
USPC .......................................... 707/692

(58) Field of Classification Search
CPC ............ G06F 17/30056; G06F 17/211; G06F 17/30035; G06F 17/218; G06F 17/30867; G06F 17/30067; G06F 17/30489
USPC .......................................................... 707/692
See application file for complete search history.

(56) References Cited

U.S. PATENT DOCUMENTS

| 2009/0100402 A1* | 4/2009 | Heuler et al. ................. 717/100 |
| 2010/0250497 A1* | 9/2010 | Redlich et al. ................ 707/661 |
| 2011/0083167 A1* | 4/2011 | Carpenter et al. ................ 726/4 |

* cited by examiner

*Primary Examiner* — Kuen Lu
(74) *Attorney, Agent, or Firm* — Duane Morris LLP

(57) ABSTRACT

An apparatus which receives client-server transactions such as HTTP REQUESTS and transforms them into a synopsis format for archival storage. HTTP transactions are logged and parsed for key words called HTTP METHODS. For each HTTP METHOD, data is extracted from the message or the resources provided by the transaction. The data is efficiently stored into a transaction store. The data is also indexed and the index is stored into the transaction store. A record is kept for all concurrent sessions by usernames associated with a directory entry.

2 Claims, 8 Drawing Sheets

US 8,725,704 B2

CLIENT-SERVER TRANSACTIONAL PRE-ARCHIVAL APPARATUS

RELATED APPLICATIONS

None

BACKGROUND

Providers of Internet access, such as enterprises, schools, libraries, employers, government bodies, and parents have an obligation, in some cases legal or self-interest, to protect information within and transiting their gateways. Websites external to their networks may provide destinations or sources of data, which they desire not to enter or leave their control. Conventional systems are overwhelmed by the volume, complexity, and anonymity of "bits on a wire".

It is known in conventional systems that web archiving refers to taking a snapshot of all pages in the hierarchy of a static website which is unrelated to the problem of controlling data leakage. However even this has become archaic when a website serves an application or operates a database. Another conventional configuration as illustrated in FIG. 1 is a sniffer apparatus 300 coupled to a network 230 which logs packets representing requests from a user client such as a browser to a website and hypertext document which are responses transmitted from a server which transit the network. While all traffic may be logged into a file system 910, it is known that the quantities are enormous and except for governmental entities impractical to store and if stored uneconomical to analyze after storage. This problem is because each packet in isolation may be related to many different protocols and many applications on an uncountable number of websites.

What is needed is a way for a network operator providing Internet access to track information, images, and intellectual property which is exchanged with one or more external servers and to more efficiently trace the senders and receivers thereof.

BRIEF DESCRIPTION OF FIGURES

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 1 is a system block diagram of a prior art web archiving system including a sniffer apparatus.

FIG. 2 is a block diagram showing a client-server-transaction pre-archival apparatus (CSTPA) embodiment comprising at least four circuits communicatively coupled, the coupled circuits including a record storage circuit, an observing, decrypting, and protection circuit, an user identification circuit, and a transformation circuit;

FIG. 3 is a block diagram of a CSTPA embodiment that includes a content extraction circuit;

FIG. 4 is a block diagram of a CSTPA embodiment that includes a declutter filter;

FIG. 5 is a block diagram of a CSPTA embodiment that includes a rule-based parsing circuit that is coupled to a parsing rules store;

FIG. 6 is a block diagram of a CSPTA embodiment that includes a link to receive data from the transaction store to enable updated parsing rules to be applied by the rule based parsing circuit to previously stored records;

FIG. 7 is a block diagram of a CSPTA embodiment that also includes a transactional pairing circuit and that receives responses transmitted by at least one server apparatus through the network, enabling the transactional pairing circuit to match requests and responses to identify transaction pairs or chains; and FIG. 8 is a block diagram of a CSPTA embodiment including a user identification circuit to build or cross reference between external account usernames and a local directory entry known to an organization providing a connection to the network and that is also responsible for data integrity of the network.

SUMMARY OF THE INVENTION

An apparatus is coupled to a network where it can observe client requests from within a local network and responses from a plurality of servers communicatively coupled through a wide area network such as the Internet. The apparatus is coupled to a transaction store in embodiments an email archiver or a database which may provide access to or include a search engine. In an embodiment the apparatus further comprises a store of parsing rules. In an embodiment the parsing rules may be applied to either transactions already stored or new requests and responses provided by the local network. In an embodiment the apparatus further comprises a Multiple Identity Cross-Reference store which tracks all the usernames of all the external applications that a member of the local directory makes use of from a user client in the network.

A method provides for logging, parsing, extracting, storing, and indexing content of HTTP requests and responses including the content of requests and the resources provided by a website. Both the analyzed/transformed data is stored and the raw data which may be reparsed with new rules at a later time. In some cases a request is used to transmit data from the user agent to a webserver. The invention enables searching the transaction store for content and for the directory entry of the user associated with data and transactions which are observed on the network.

It is understood among those skilled in the art that a website server may not be a separate physical server and may not only share hardware resources but also share software with an application store. It is described separately solely for clarity of understanding as separably inventive.

DETAILED DISCLOSURE OF EMBODIMENTS OF THE INVENTION

In one aspect of the invention a computer-executable method includes receiving a plurality of http or https requests and responses, logging them, parsing for relevant data, extracting data from text or images, storing the raw data as well as a synopsis of contents of the requests and responses, and indexing the stored matter for searchable retrieval.

In an embodiment the data is deduped before indexing. In an embodiment, the data is decrypted. The transaction store may be an email archiver, database, or a log file.

Figure 1:
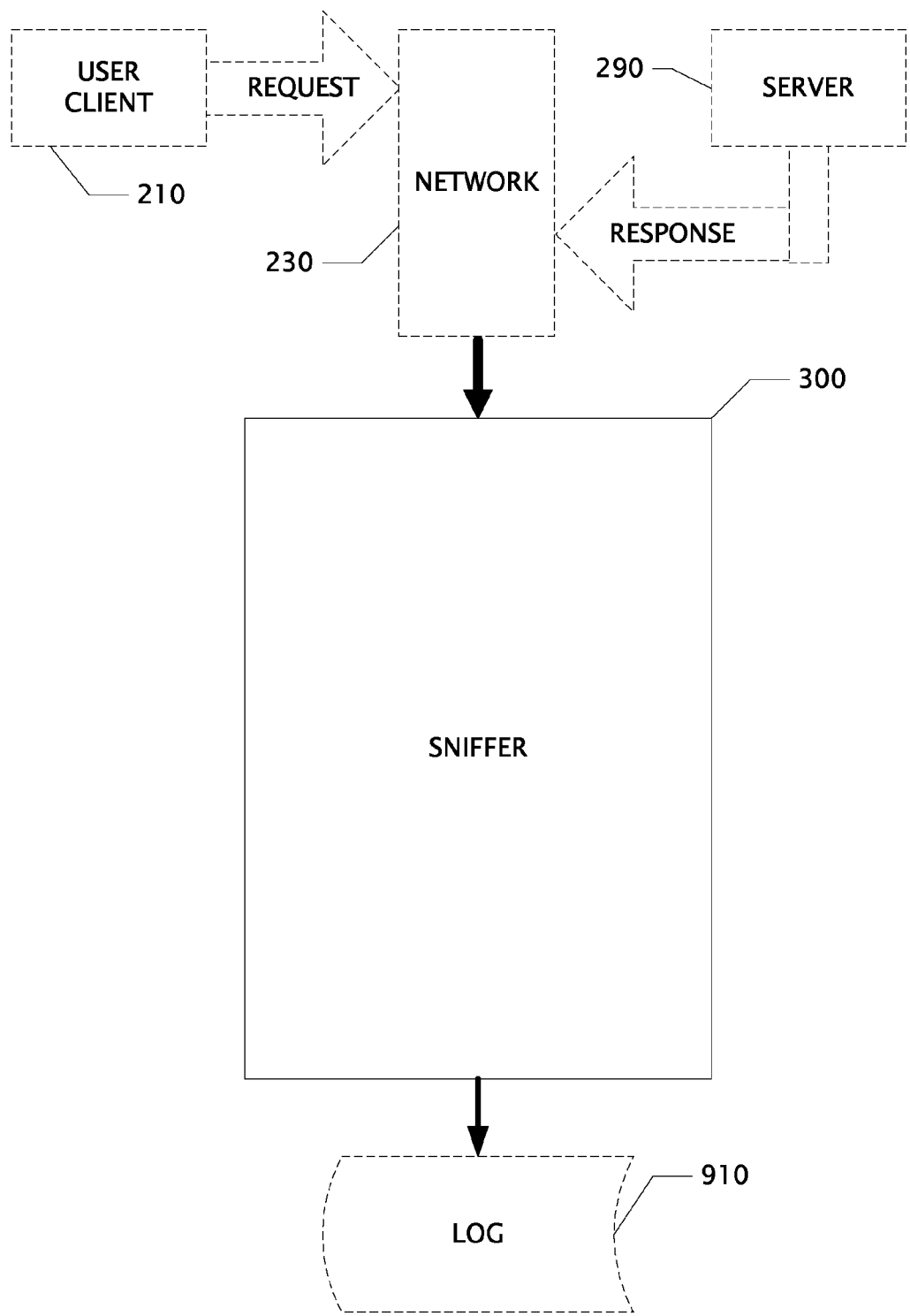
FIGS. 1-8 are system block diagrams of the apparatus and its intended interaction with elements of the network and peripheral hardware equipment.
Figure 2:
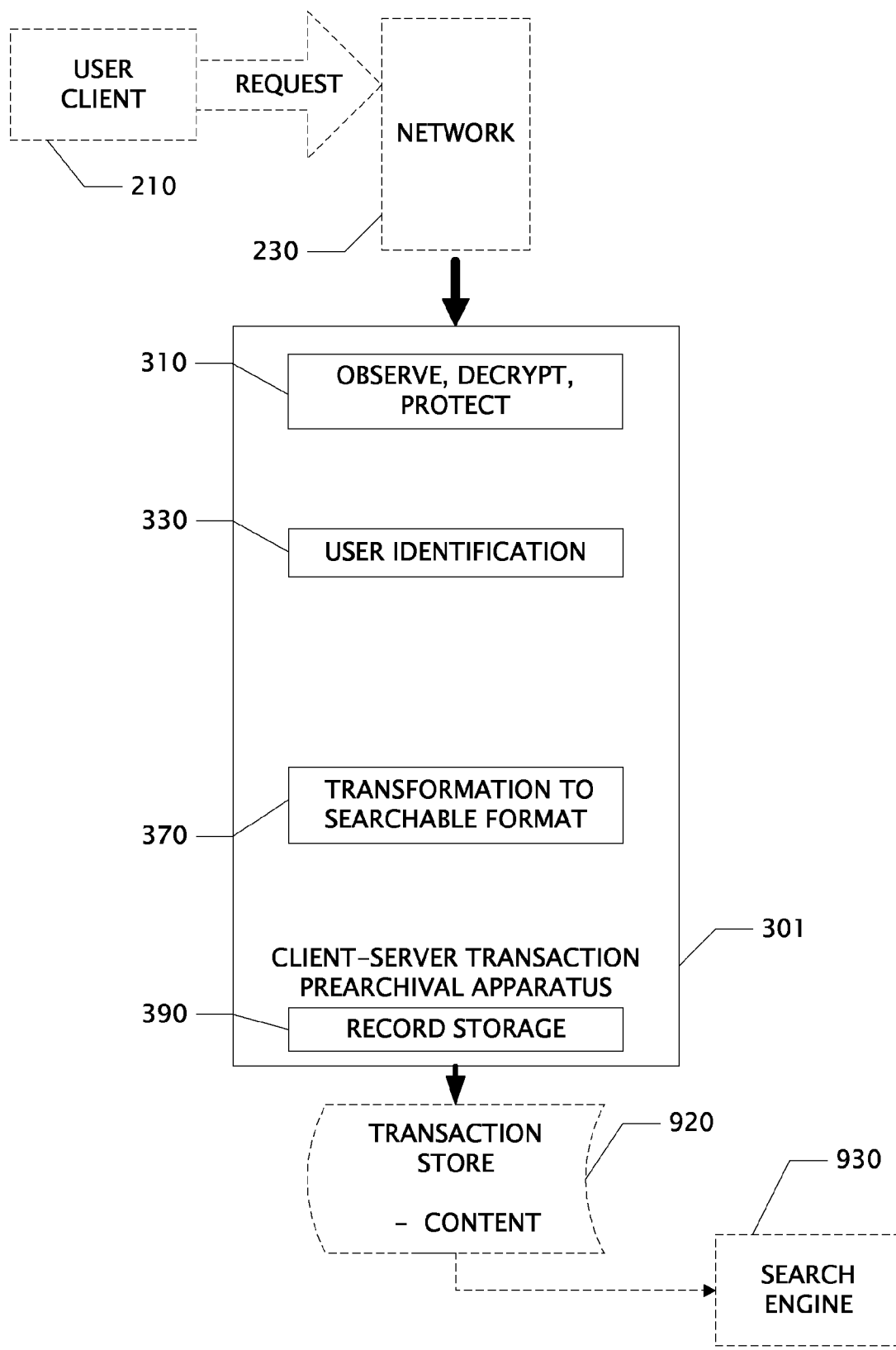

Referring now to the drawings, FIG. 2 is a block diagram of one embodiment of the invention, an apparatus communicatively coupled to a network 230 and also coupled to a transaction store 920. In an embodiment the transaction store is an email archiver but it may be a database, any storage device or service. In an embodiment the transaction store is coupled to a search engine 930 which allows a user to find client-server transactions that fit one or more criteria.

A user client 210 transmits a request intended for a server 290, the request passing through a network 230 which provides the same request to a client-server transaction prearchival analysis apparatus (CSTPA) 301. In an embodiment the CSTPA is focussed on outgoing transactions such as HTTP(S) requests. In other embodiments posts, gets, puts and their equivalent non-limiting exemplary methods which submit data to a server also herein disclosed.

It is understood that a circuit may be implemented by configuring a processor with computer executable instructions stored on a non-transitory computer readable medium. A processor configured to execute instructions corresponding to method step is equivalent to the apparatus disclosed below.

Referring now to FIG. 2, a client-server-transaction-prearchival apparatus is disclosed 301 which has at least four circuits communicatively coupled. A record storage circuit 390 is coupled to the other circuits and is further coupled to a non-transitory computer readable media configured as a transaction store which contains at least contents of the requests in a searchable format. The transaction store 920 and a search engine 930 and functional equivalents are well-known in the art. In an embodiment the transaction store is an email archiver and the record storage circuit converts the request records into the form of emails with attachments. In an embodiment the transaction store and search engine are a database server. A transformation circuit 370 converts one or more user client protocol data types into a single searchable format. In an embodiment it converts HTTP POST requests into an email archive format. Depending on the type of application, keywords or tags are added to identify fields in each record. A special circuit tracks requests to user identification 330 which may require state information on which IP or MAC address is associated with a usernames, logons, or LDAP registration. The apparatus also includes a circuit 310 to observe, decrypt, and protect portions of incoming transactions, which circuit is coupled to an network 230. In an embodiment the circuit only tracks HTTP REQUESTs. In an embodiment the received data may be in encrypted format which must be decrypted for processing. Certain fields such as passwords and financial account numbers may be identified and protected to prevent data leakage from the apparatus. In an embodiment financial account numbers are not stored or are converted upon observation into a unique verifier which is difficult to reverse within a time span. In an embodiment, text strings which fail a multi-lingual dictionary test may be protected from archival. In an embodiment numeric strings that match regular expressions for banking or financial account numbers may be protected from archival. Protected may mean redacted, masked, deleted, hashed, or replaced with random noise. Field names that suggest private data may trigger a mask of the field value.

Figure 3:
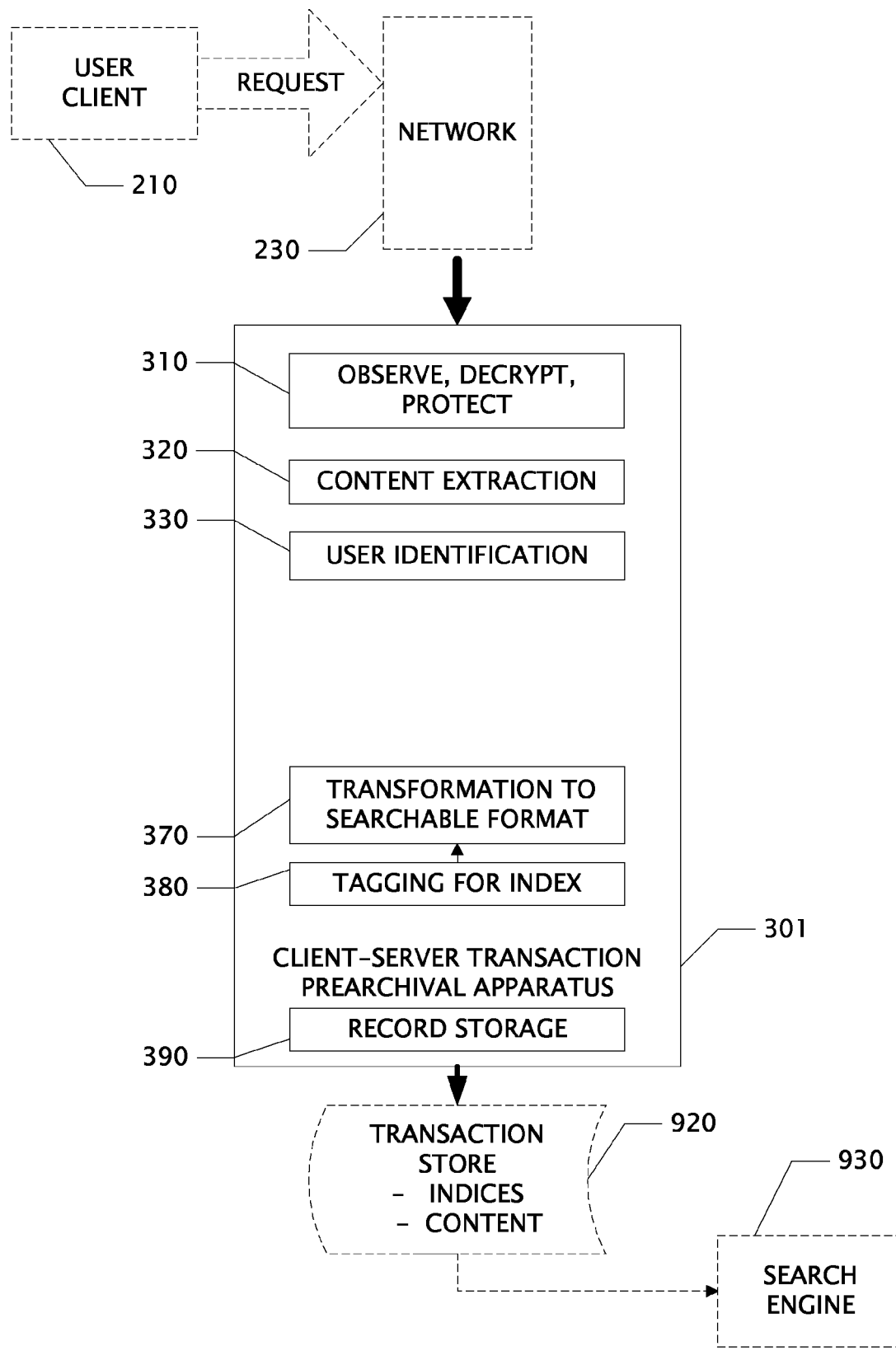

Referring now to FIG. 3, in an embodiment apparatus 301 also contains a content extraction circuit 320. Pattern detection or recognition algorithms may be applied to images and binary files to enable indexing and searching. References to jpegs, pdfs, or media files may be resolved and converted to attachments and stored as compressed files. In an embodiment the apparatus also has a circuit 380 for tagging records for index tables or keys. This allows quicker searching or aggregation or reporting on trends. Indexing operates on the message, the headers, the content extracted, and the source and destination to provide tags which may be used to retrieve data from storage. The format transformation converts one or more transaction, protocol, file formats, or data types into a single efficiently searchable record and metadata about the transaction which may be easily stored, searched, retrieved or analyzed for patterns of behavior. In an embodiment the untransformed data is also stored.

Figure 4:
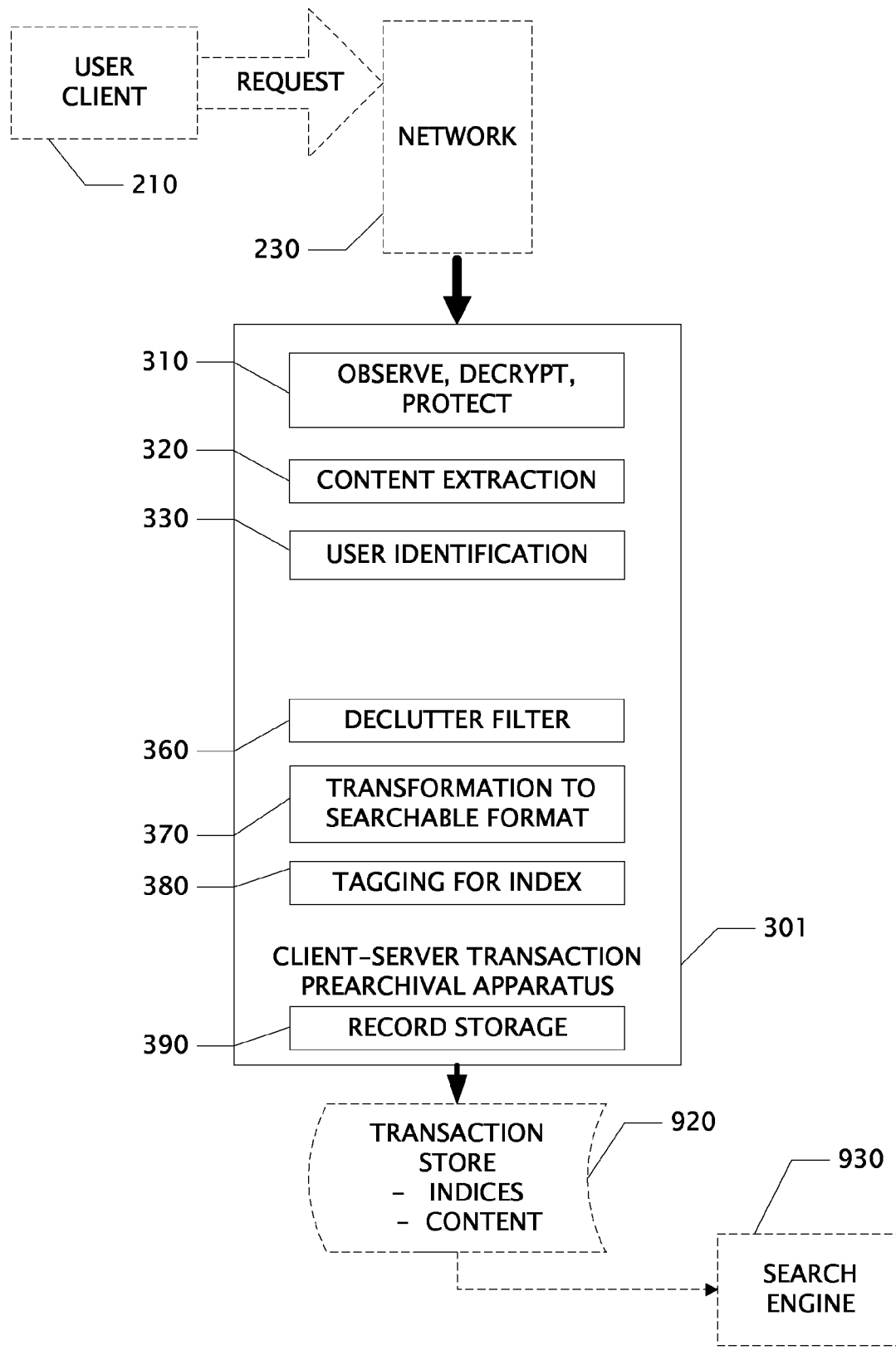

Referring now to FIG. 4, in an embodiment, apparatus 301 also contains a declutter filter 360. This reduces the quantity of data that is transformed into a searchable format. Data which is ubiquitous, redundant, or non-determinant may be compressed or discarded. Data which is duplicated in many requests may be identified and simply noted as redundant.

Figure 5:
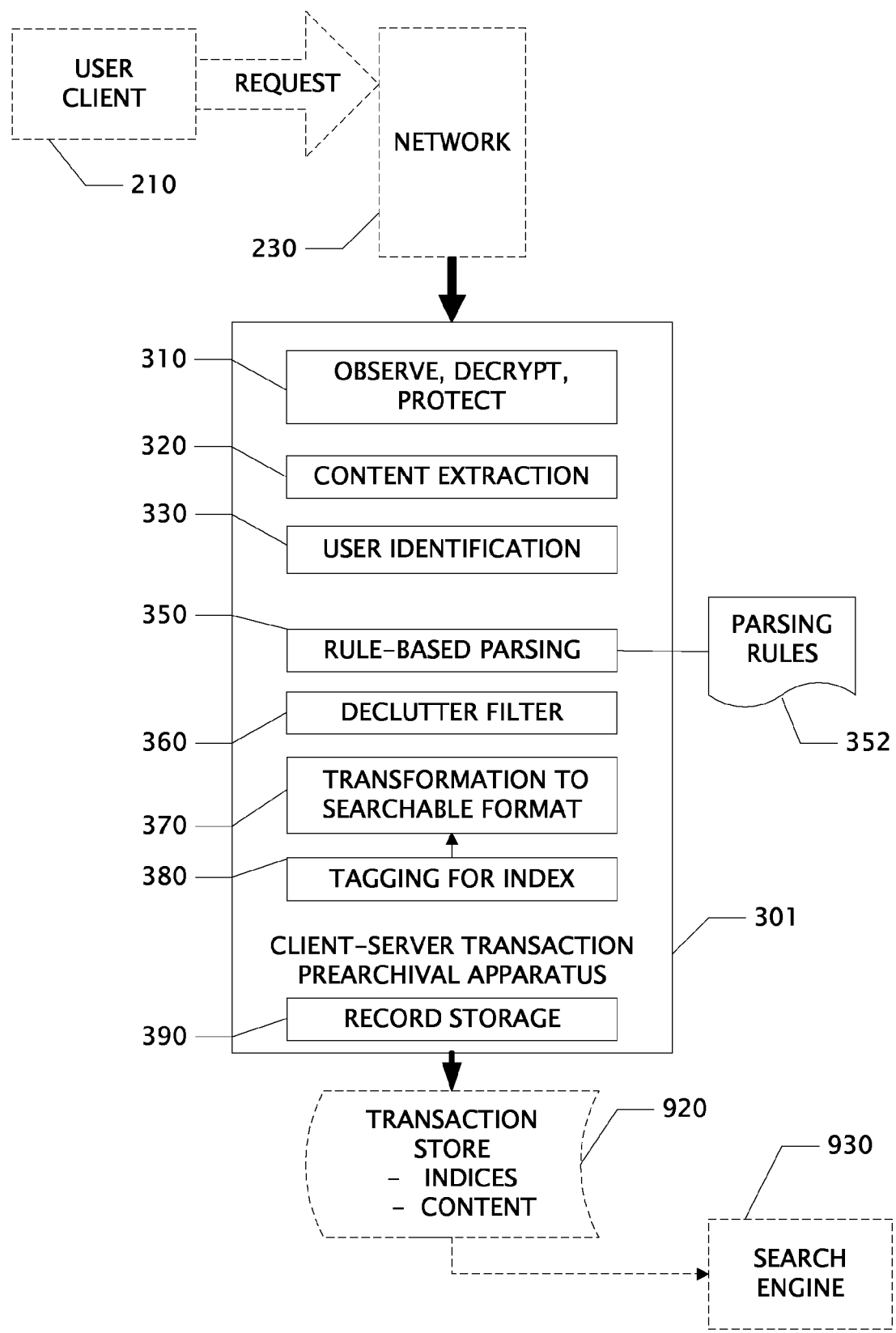

Referring now to FIG. 5, in an embodiment, apparatus 301 also contains a circuit to execute rule-based parsing 350 which is coupled to a parsing rules store 352. Complex categorization of requests or sequences may be identified by applying a parsing rules base which may be updated without reconfiguring the apparatus.

Figure 6:
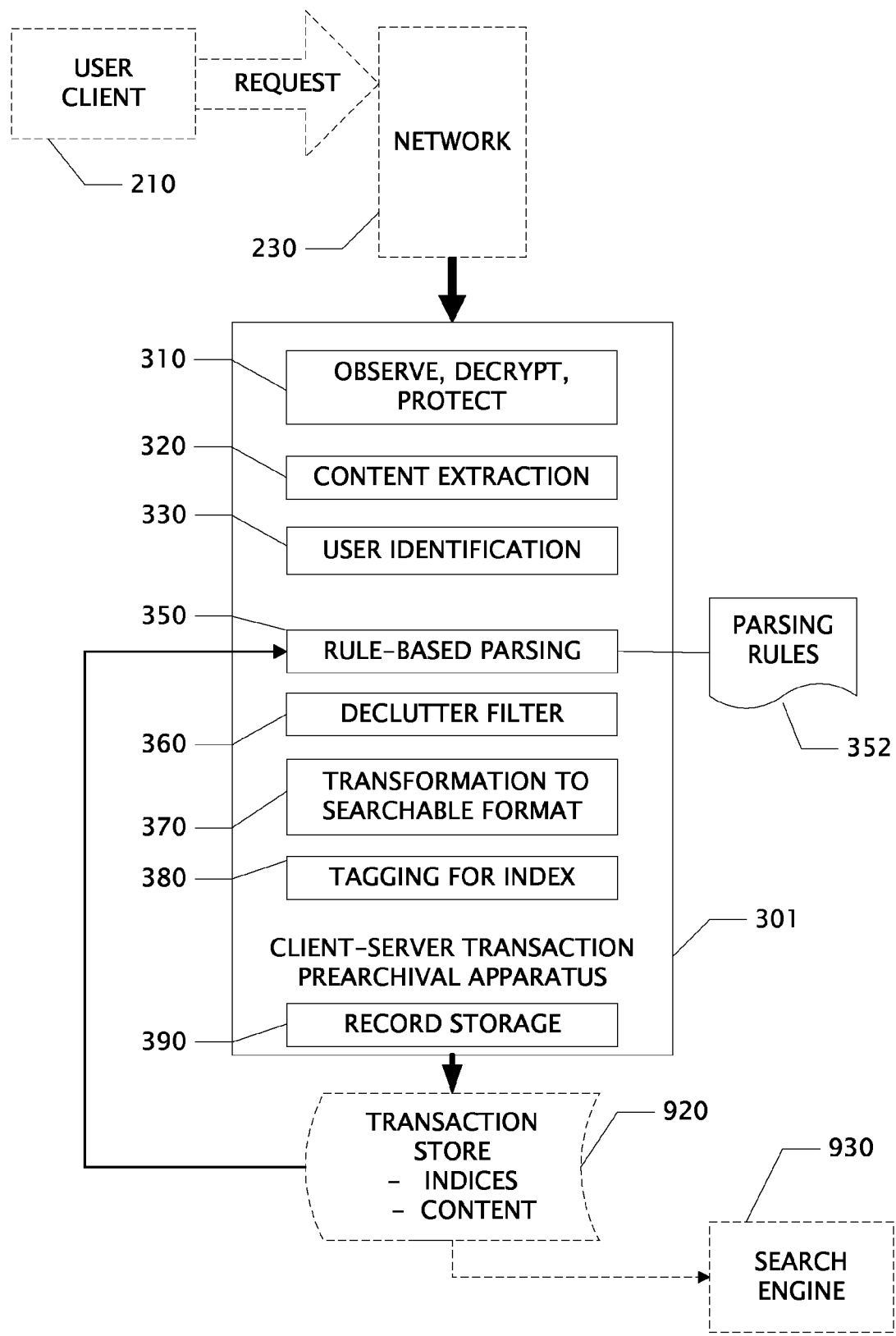

Referring now to FIG. 6, in an embodiment, the apparatus 301 also has a link to receive data from the transaction store 920 which enables updated parsing rules 352 to be applied by the rule-based parsing circuit 350 to previously stored records. Untransformed source records may be parsed anew with updated rules and stored with new indices.

Figure 7:
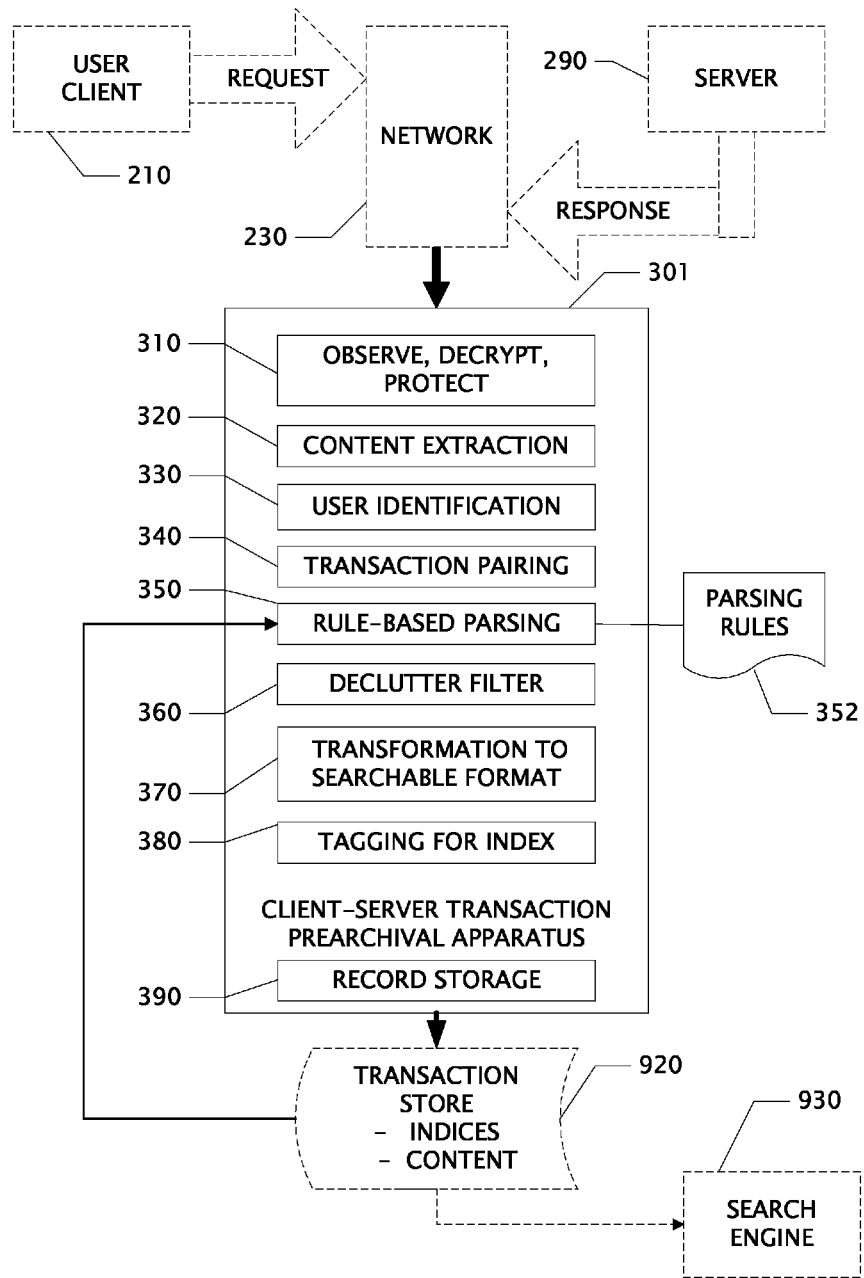

Referring now to FIG. 7, in an embodiment the apparatus 301 also receives responses transmitted by at least one server 290 through the network 230. This enables a circuit 340 to match requests and responses to identify transaction pairs or chains.

It is common for each single individual person within an organization to have accounts at many external applications with mildly or wildly divergent account usernames. In part this is due to unique name space limitations from one bank to another or one email system to another. In part this is due to account usernames in multi-player games or political for a not being suitable for social networks or chat or voice.

A person may be logged into several web applications simultaneously and copy paste from one to another or comment on a third while attending to a fourth. Voice, video, and text channels may be simultaneously in progress and each in isolation may be ambiguous, unintelligible, or obscure.

Figure 8:
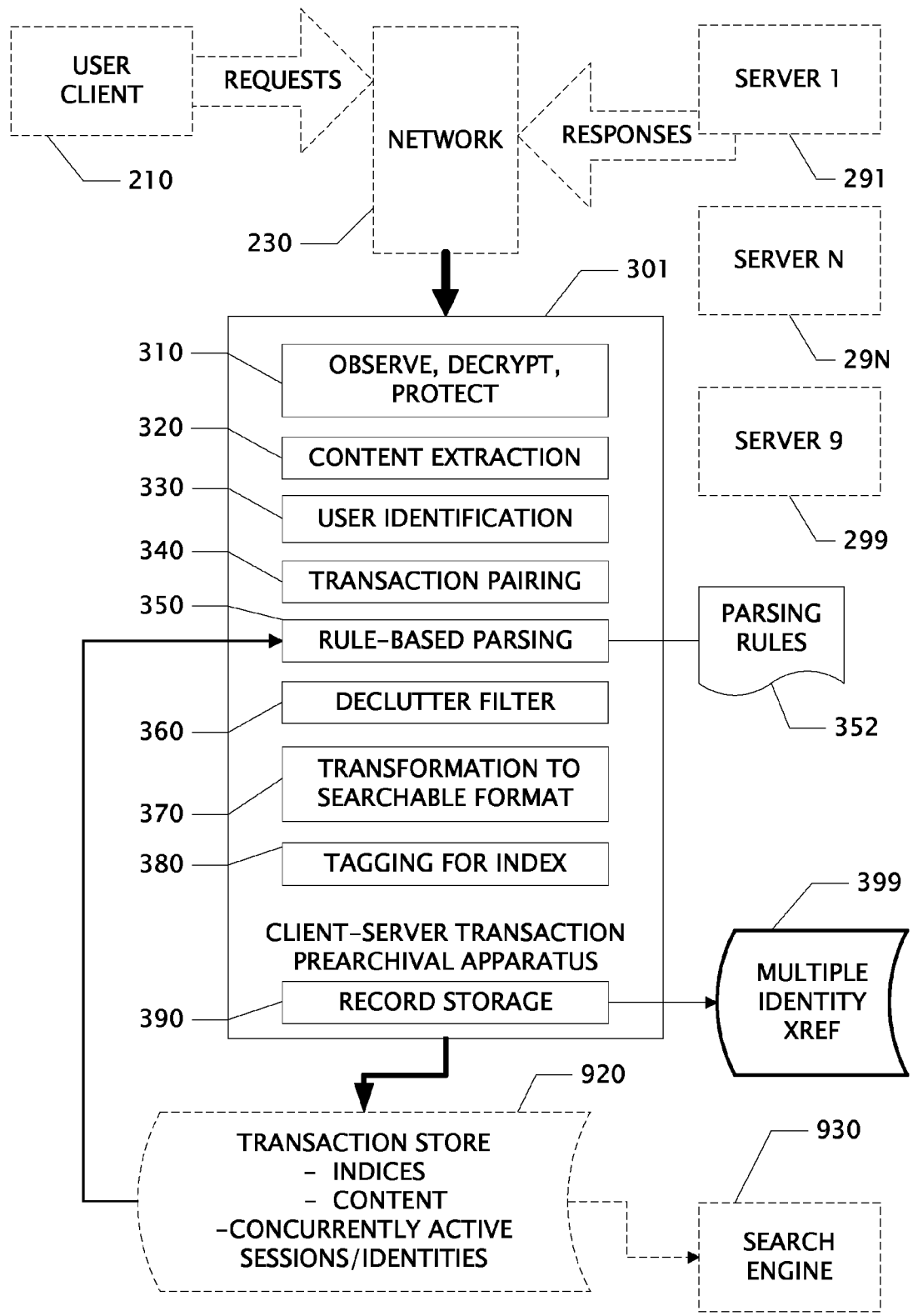

Referring now to FIG. 8, an aspect of the user identification circuit 330 is to build or cross reference between external account usernames and a local directory entry having an identity known to the organization providing the network connection and responsible for data integrity of the network. This relationship among usernames of different server applications 291-299 may be recorded into a multiple identity cross-reference store 399.

In an embodiment, the record storage circuit 390 accesses the Multiple Identity Cross Reference store 399 to identify the concurrently active sessions or identities on the user client whenever a transaction record is to be stored into the transaction store.

An aspect of circuit 340 is to identify a sequence of transactions as a pair or chain and place context around each transaction by identifying the external applications accessed by account usernames associated with the real identity actively transmitting data across the network. In other words a transaction may be a pair of one response from one server and one request to a different server each using a different username from the other.

One aspect of the invention is a client-server-transaction-prearchival apparatus which apparatus comprises: a communication interface coupled to a network to receive a plurality of client-server transactions and a transaction storage interface to store a transformed synopsis record for each client server transaction and a circuit for content extraction, a circuit for indexing, and a circuit for transformation of multiple client-server transaction data into a synopsis format. In other words, if a user client is concurrently supporting sessions with multiple servers, even if the usernames of each application are not similar, the apparatus will store all the data received or transmitted into one synopsis record. In an embodiment the apparatus is coupled to a searchable transaction store. In an embodiment the apparatus further comprises a search engine, or a data base, or a link to a remote service for storage, archival, and search.

In an embodiment, the transaction storage interface is coupled to an email archiver and the synopsis format is an email. In an embodiment, the transaction storage interface is coupled to a remote repository. In an embodiment, the transaction storage interface is coupled to a search engine.

In an embodiment, the client server transaction is an HTTP REQUEST. In an embodiment the apparatus also has a clutter filter circuit whereby redundant or non-distinguishing content is removed. In an embodiment the apparatus also has a user identification circuit whereby a user identity is obtained for each client request. In an embodiment, the apparatus also has a rule-based parsing circuit coupled to a parsing rules store.

In an embodiment, the rule-based parsing circuit examines contents of a client server transaction for data which is sensitive, proprietary, confidential, personal, or violates a regulation for protecting privacy.

In an embodiment the apparatus also has a link from the transaction store back to the analysis apparatus whereby new parsing rules may be applied to stored raw data or synopses of transactions. In an embodiment the apparatus also has a multiple identity cross-reference store coupled to a request-user-directory circuit and further coupled a record storage circuit. In an embodiment the apparatus also has a transaction pair or chain identification circuit to match responses to requests.

Another aspect of the invention is a method for tracing data transfer over http and https protocols comprising:
 observing each http request and each related http response;
 parsing each http message for selected content;
 extracting content from the payload of each http message;
 storing the content to a transaction store;
 indexing the content; and
 storing the indexes to a transaction store.
 In an embodiment, the method also includes
 decrypting data transmitted from a user client to a web server and data transmitted by a web server to a user client.
 In an embodiment, the method also includes
 deduplicating data and storing references to duplicate data records.

In an embodiment, a transaction store is an email archiver, a repository, or a search system. In an embodiment, a transaction store is a log file. In an embodiment, the method also includes searching the index portion of the transaction store for the argument of a query. In an embodiment, the method also includes collecting usernames for all external applications related to a directory entry of a user identity.

In an embodiment, the method also includes storing a directory entry for each external application user name into a multiple identity cross-reference store 399. In an embodiment, the method also includes determining at least one concurrently active session by the same user at the time rule-based parsing indicates a transaction of interest is to be stored.

In an embodiment, the method also includes storing an other concurrent session by the same user identity to a transaction store record.

Means, Embodiments, and Structures

Embodiments of the present invention may be practiced with various computer system configurations including hand-held devices, microprocessor systems, microprocessor-based or programmable consumer electronics, minicomputers, mainframe computers and the like.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Any of the operations described herein that form part of the invention are useful machine operations. The invention also related to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. References to a computer readable medium mean any of well-known non-transitory tangible media.

CONCLUSION

The present invention is easily distinguished from conventional systems by pairing and chaining transactions conducted by a user client rather than recording individual requests; by building and accessing a multiple identity cross reference to identify concurrently active sessions even when the user does not have the same username in each server; by transforming client traffic from multiple protocols into a single searchable format with tags for indexing and retrieval; by prearchival transformation of raw data; and by parsing rules which adapt rule-based parsing to identify a transaction of interest and which may be applied to history in the transaction store.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for tracing data transfer across a network boundary between a user client on one side of the network boundary and a server apparatus on another side of the network boundary, wherein the data transfer is provided using http and https protocols, the method using:
- a client-server transaction prearchival analysis apparatus (CSTPA) that is separate from the user client and the server apparatus and that is responsive to communications that cross the network boundary,
- a client-server transaction store apparatus having a non-transitory memory, the client-server transaction store apparatus separate from the user client and the server apparatus and responsive to the CSTPA, and
- wherein the CSTPA includes a transformation circuit configured to convert one or more client user protocol data types into a single searchable format; a rule-based parsing circuit; an observer, decrypt, and protect circuit; an indexing circuit; and a record storage circuit;

the method comprising the steps of:
- receiving, at the CSTPA, a plurality of protocol data types transmitted from the user client to the server apparatus across the network boundary;
- transforming, using the transformation circuit, the protocol data types into a single searchable format, wherein the receiving of a plurality of protocol data types includes a post request transmitted from the user client to the server apparatus and the post request includes a payload comprising content;
- parsing the post request for the content using the rule-based parsing circuit;
- preventing data leakage from the CSTPA, wherein said preventing data leakage comprises identifying and protecting portions of the content from archival using the observer, decrypt, and protect circuit, and protecting is defined as replacing data with random noise, or redacting, masking, deleting, or hashing the data;
- storing the content to the client-server transaction store using the record storage circuit;
- indexing the content to produce indices using the transformation circuit alone or in conjunction with the indexing circuit;
- storing the indices to a computer-readable medium in the client-server transaction store using the record storage circuit; and
- updating parsing rules used by the rule-based parsing circuit and applying the updated parsing rules to previously stored content from the client-server transaction store using a link outside the network from the client-transaction store to the rule-based parsing circuit.

2. A computer accessible non-transitory storage device for recording client-server transactions that are transmitted across a network boundary between a user client and a server apparatus, said computer-accessible non-transitory storage device comprising instructions that, when executed by a computer or processor separate from the user client and the server apparatus, cause the computer or processor to:
- transform client-server transaction data into a single synopsis format record;
- store a synopsis format record of a transformed client-server transaction to an email archiver;
- obtain a user identity for each client request;
- examine contents of a client-server transaction for data that is sensitive, proprietary, confidential, personal, or violates a regulation for protecting privacy;
- prevent data leakage from the computer or processor, wherein to prevent data leakage comprises the instructions to cause the computer or processor to identify and protect portions of the content from archival, and protecting is defined as replacing data with random noise, or redacting, masking, deleting, or hashing the data;
- apply new parsing rules to stored transactions stored in the email archiver;
- cross-reference multiple identities of users accessing different servers; and
- match server responses to client requests to create a single client-server transaction.

* * * * *